United States Patent
Wurzer et al.

(10) Patent No.: US 10,625,679 B1
(45) Date of Patent: Apr. 21, 2020

(54) KIT FOR ASSEMBLING A CABINET IN A SLEEPER CAB OF A TRUCK

(71) Applicants: Adam J. Wurzer, Carroll, IA (US);
Terry D. Wurzer, Panora, IA (US);
David T. Wurzer, Carroll, IA (US)

(72) Inventors: Adam J. Wurzer, Carroll, IA (US);
Terry D. Wurzer, Panora, IA (US);
David T. Wurzer, Carroll, IA (US)

( * ) Notice: Subject to any disclaimer, the term of this patent is extended or adjusted under 35 U.S.C. 154(b) by 3 days.

(21) Appl. No.: 15/918,065

(22) Filed: Mar. 12, 2018

(51) Int. Cl.
| | |
|---|---|
| *B60R 7/06* | (2006.01) |
| *B60R 7/08* | (2006.01) |
| *H05B 6/64* | (2006.01) |
| *F25D 23/10* | (2006.01) |
| *B62D 33/06* | (2006.01) |
| *B60R 7/04* | (2006.01) |

(52) U.S. Cl.
CPC .................. *B60R 7/04* (2013.01); *B60R 7/08* (2013.01); *F25D 23/10* (2013.01); *H05B 6/6408* (2013.01); *B62D 33/0612* (2013.01)

(58) Field of Classification Search
CPC ........................................................ B60R 7/04
USPC ........................................................ 224/539
See application file for complete search history.

(56) References Cited

U.S. PATENT DOCUMENTS

| | | | | |
|---|---|---|---|---|
| 5,704,699 A | * | 1/1998 | Pagelow | A47B 47/05 312/111 |
| 9,108,688 B2 | * | 8/2015 | Stutz | B62D 33/0612 |
| 2008/0164724 A1 | * | 7/2008 | Burnett | A47B 67/04 296/190.02 |
| 2008/0191515 A1 | * | 8/2008 | Hollenbeck | B60P 3/36 296/190.02 |
| 2009/0140537 A1 | * | 6/2009 | Kittelson | F25D 23/10 296/24.4 |
| 2011/0089797 A1 | * | 4/2011 | Simms | A47B 47/042 312/326 |

FOREIGN PATENT DOCUMENTS

| | | | | |
|---|---|---|---|---|
| CA | 2722506 A1 | * | 5/2012 | ........... A47B 47/042 |
| EP | 0371611 A1 | * | 6/1990 | .............. F24C 15/30 |

* cited by examiner

*Primary Examiner* — Justin M Larson
*Assistant Examiner* — Lester L Vanterpool
(74) *Attorney, Agent, or Firm* — Dennis L. Thomte; Thomte Patent Law Office LLC

(57) ABSTRACT

A plurality of different kits for assembling cabinets or support structures within the sleeper cab of a truck. Some of the kits are designed to support a refrigerator while other kits are designed to also support a microwave oven. At least one of the kits includes drawers for containing items. Other kits include support chests.

8 Claims, 10 Drawing Sheets

KIT FOR ASSEMBLING A CABINET IN A SLEEPER CAB OF A TRUCK

BACKGROUND OF THE INVENTION

Field of the Invention

This invention relates to a kit for assembling a cabinet in a sleeper cab of a truck. More particularly, in a first embodiment, the assembled cabinet may have a front panel with an opening for receiving a refrigerator therein with the front panel having a plurality of drawer openings formed therein which are configured to have a drawer positioned therein. Further, in a second embodiment, the drawer openings and drawers may be replaced by a storage chest having drawers slidably mounted therein. In a third embodiment, the front panel of the assembled cabinet may have an intermediate opening formed therein which is configured to have a microwave oven positioned therein. Fourth and fifth embodiments are also described.

Description of the Related Art

Many cabinets or storage units have been previously provided for use in a sleeper cab of a truck with the cabinet having a television set positioned therein. However, the cabinets of the prior art are of such size that they must be installed in the sleeper cab prior to the installation of the driver's seat and passenger's seat being installed in the cab of the truck. Thus, many sleeper cab trucks are assembled without televisions, refrigerators, etc. It is therefore extremely difficult, if not impossible, to place such a cabinet into the sleeper portion of the sleeper cab of a truck.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Several kits are provided for assembling a cabinet for use in a sleeper cab of a truck wherein the cabinet may be assembled within the sleeper cab. In a first embodiment, the kit includes a first side panel, a second side panel, a front panel, a top panel and a bottom panel. In the first embodiment, the front panel has an upper opening formed therein and a plurality of drawer openings formed therein below the upper opening. The kit also includes a refrigerator which is configured to be inserted into the upper opening of the front panel. In another embodiment, the drawer openings and drawers are replaced by a storage chest having drawers slidably mounted therein. In a third embodiment, the kit also includes a microwave oven which is positioned in an intermediate opening in the front panel. In a fourth embodiment, the top panel, the bottom panel, the first side panel and the second side panel are omitted. In the fourth embodiment, the first side panel is replaced by a first side trim and support structure and the second side panel is replaced by a second side trim and support structure. In the fourth embodiment, the lower ends of the first and second side trim and support structures are secured to the truck floor and the upper ends of the first and second side trim and support structures are secured to existing structure in the sleeper cab. The fourth embodiment will be used in some versions of trucks which have sides of a closet that are already in the truck. In the fourth embodiment, a storage chest is positioned between the lower ends of the first and second side trim and support structures. In the fourth embodiment, a refrigerator is positioned between the first and second side trim and support structures above the storage chest. A fifth embodiment of the kit of the invention is described which is substantially identical to the fourth embodiment except that a microwave oven is positioned between the lower end of the refrigerator and the upper end of the storage chest. In the fifth embodiment, a storage chest is positioned below the microwave oven.

It is a principal object of the invention to provide a kit for assembling a cabinet for use in a sleeper cab of a truck.

A further object of the invention is to provide a kit for assembling a cabinet for use in a sleeper cab of a truck wherein the cabinet may be assembled within the sleeper cab.

A further object of the invention is to provide a kit for assembling a cabinet for use in a sleeper cab of a truck with the cabinet including a refrigerator mounted in the upper end of the front panel of the cabinet and a microwave oven mounted in an intermediate opening formed in the front of the front panel of the cabinet and a plurality of drawers or a storage chest positioned in the front panel of the cabinet.

A further object of the invention is to provide a kit for assembling a cabinet for use in a sleeper cab of a truck wherein the cabinet may be assembled within the sleeper cab with the cabinet having a chest with drawers slidably mounted therein which is positioned within the cabinet below the refrigerator or below the microwave oven if the cabinet includes a microwave oven.

A further object of the invention is to provide a kit for assembling a cabinet for use in a sleeper cab of the truck which may be used with a closet positioned within the sleeper cab.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
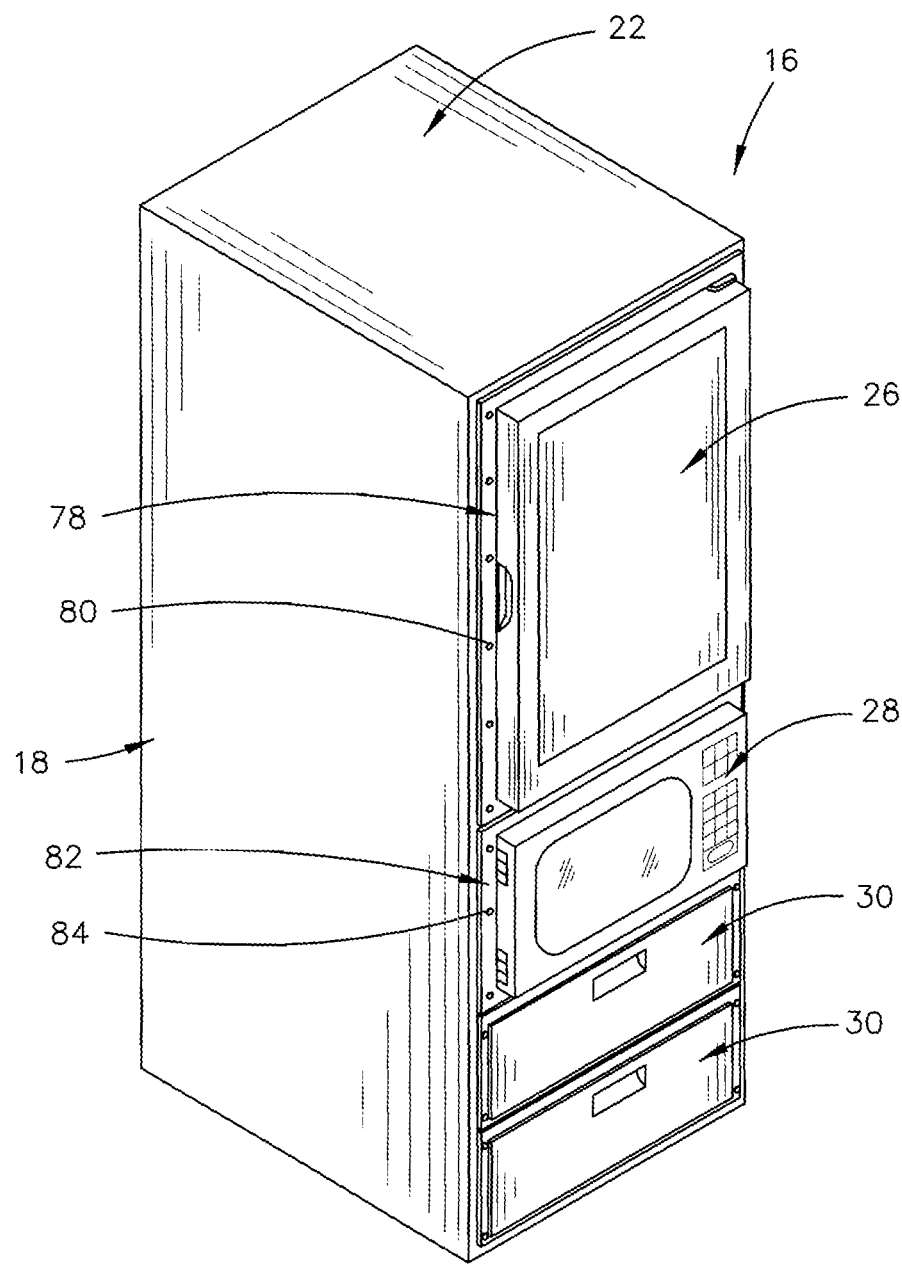
FIG. 1 is a perspective view of one embodiment of an assembled kit of this invention.
Figure 2:
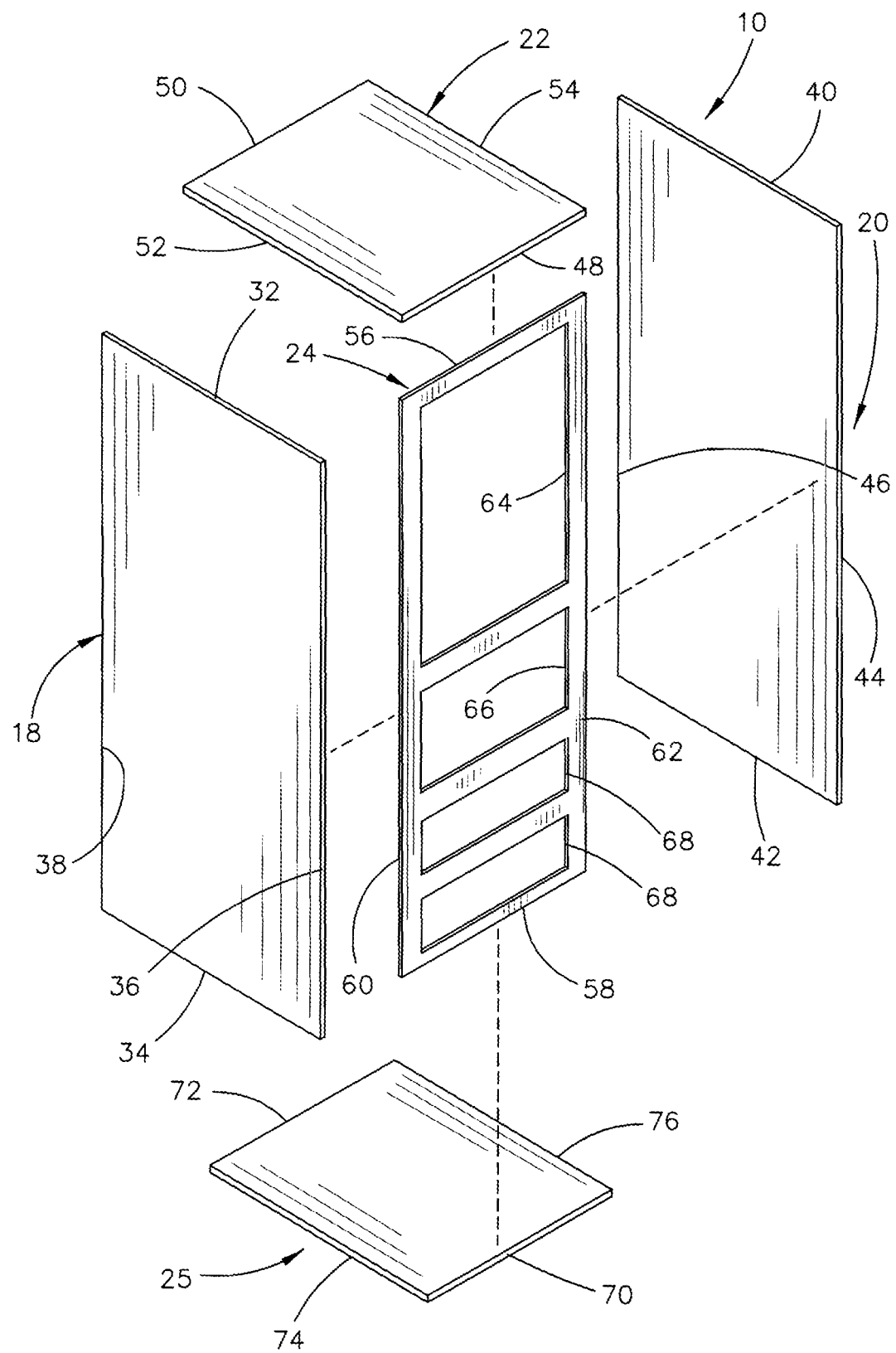
FIG. 2 is an exploded perspective view of a portion of the kit of FIG. 1.
Figure 3:
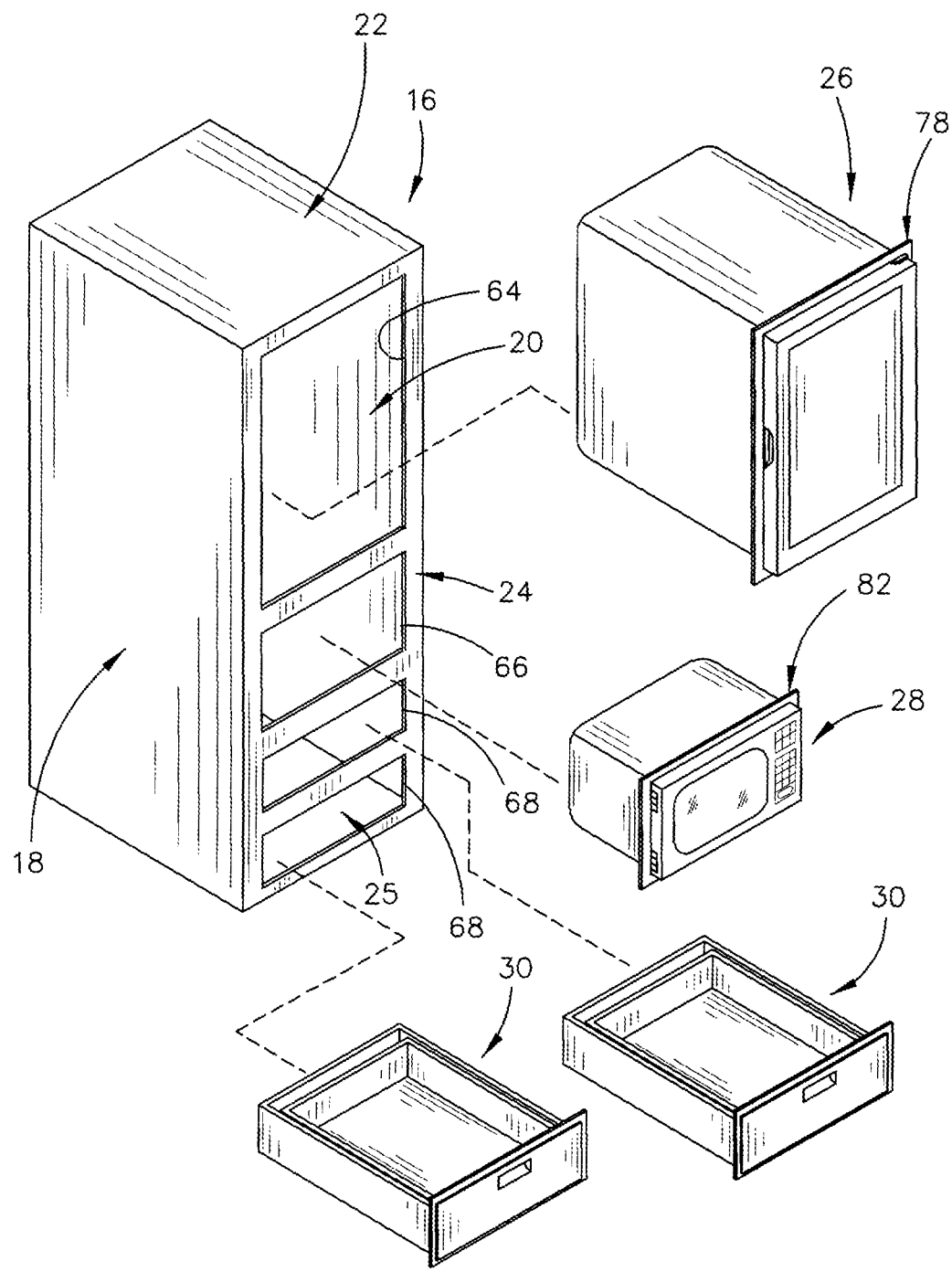
FIG. 3 is an exploded perspective view of the kit of FIG. 1.
Figure 4:
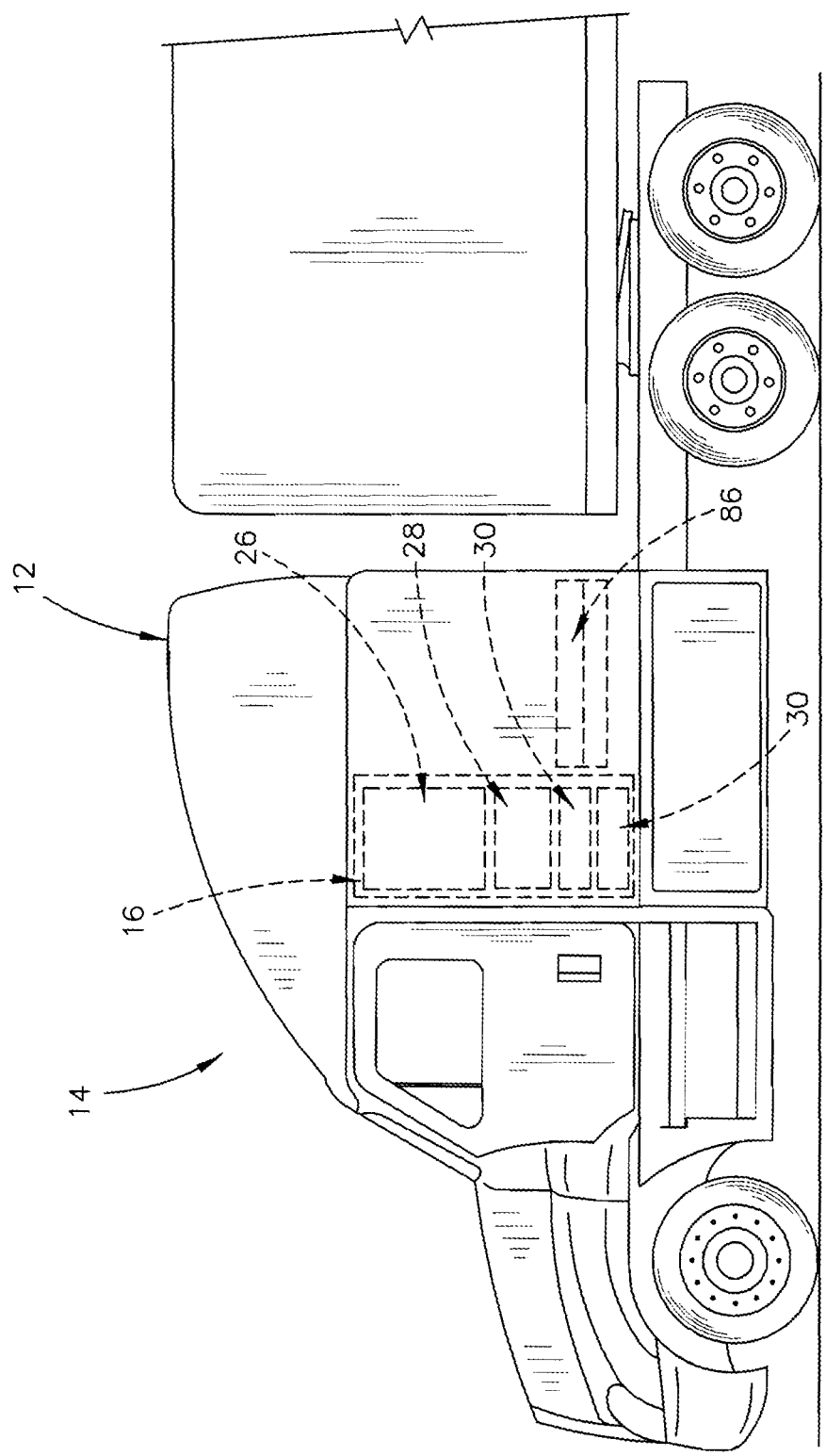
FIG. 4 is a side elevational view of a truck sleeper cab having the assembled cabinet of FIG. 1 being shown by broken lines.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In FIGS. 1-4, the numeral 10 refers to one embodiment of the kit of this invention which may be assembled in the sleeper cab 12 of a truck 14 to create an upstanding cabinet 16. Kit 10 includes a first side panel 18, a second side panel 20, a top panel 22, a front panel 24, a bottom panel 25, a refrigerator 26, a microwave oven 28 and drawers 30. In another embodiment, the microwave oven 28 is not included in the kit 10 as will be described hereinafter.

Side panel 18 includes an upper end 32, a lower end 34, a front end 36, and a rear end 38. Side panel 20 includes an upper end 40, a lower end 42, a front end 44 and a rear end 46. Top panel 22 includes a front end 48, a rear end 50, a first side 52 and a second side 54.

Front panel 24 includes an upper end 56, a lower end 58, a first side 60 and a second side 62. Front panel 24 includes an upper opening 64 formed therein. Front panel 24 also includes an intermediate opening 66 formed therein below opening 64. Front panel 24 further includes a plurality of vertically spaced-apart drawer openings 68 formed therein. Bottom panel 25 includes a front end 70, a rear end 72, a first side 74 and a second side 76.

The panels 18, 20, 22, 24 and 25 may be comprised of a suitable material such as wood, plastic, steel, aluminum, etc. The panels 18, 20, 22, 24 and 25 are joined together in the sleeper cab 12 by any convenient and suitable means. If the cabinet 16 were assembled outside of the sleeper cab 12, the size of the cabinet 16 would make it difficult, if not impossible, to position the cabinet 16 in the sleeper cab.

When the panels 18, 20, 22, 24, and 25 have been joined together in the sleeper cab 12, the bottom panel 25 is preferably secured to the floor of the sleeper cab by screws or the like. The drawers 30 may then be positioned in the drawer openings 68. The microwave oven 28 is then positioned in the intermediate opening 66. The refrigerator 26 may then be positioned in the upper opening 64.

To facilitate the mounting of the refrigerator 26 in the cabinet 16, the sides of the refrigerator 26 have an outwardly extending mounting flange 78 secured thereto with the mounting flange 78 being secured to the front panel 24 by screws 80 or the like. Similarly, the microwave oven 28 has mounting flange 82 extending from its sides thereof which are secured to the front panel 24 by screws 84 or the like. As seen, the cabinet 16 is positioned forwardly of the bed 86 in the sleeper cab 12.

Figure 5:
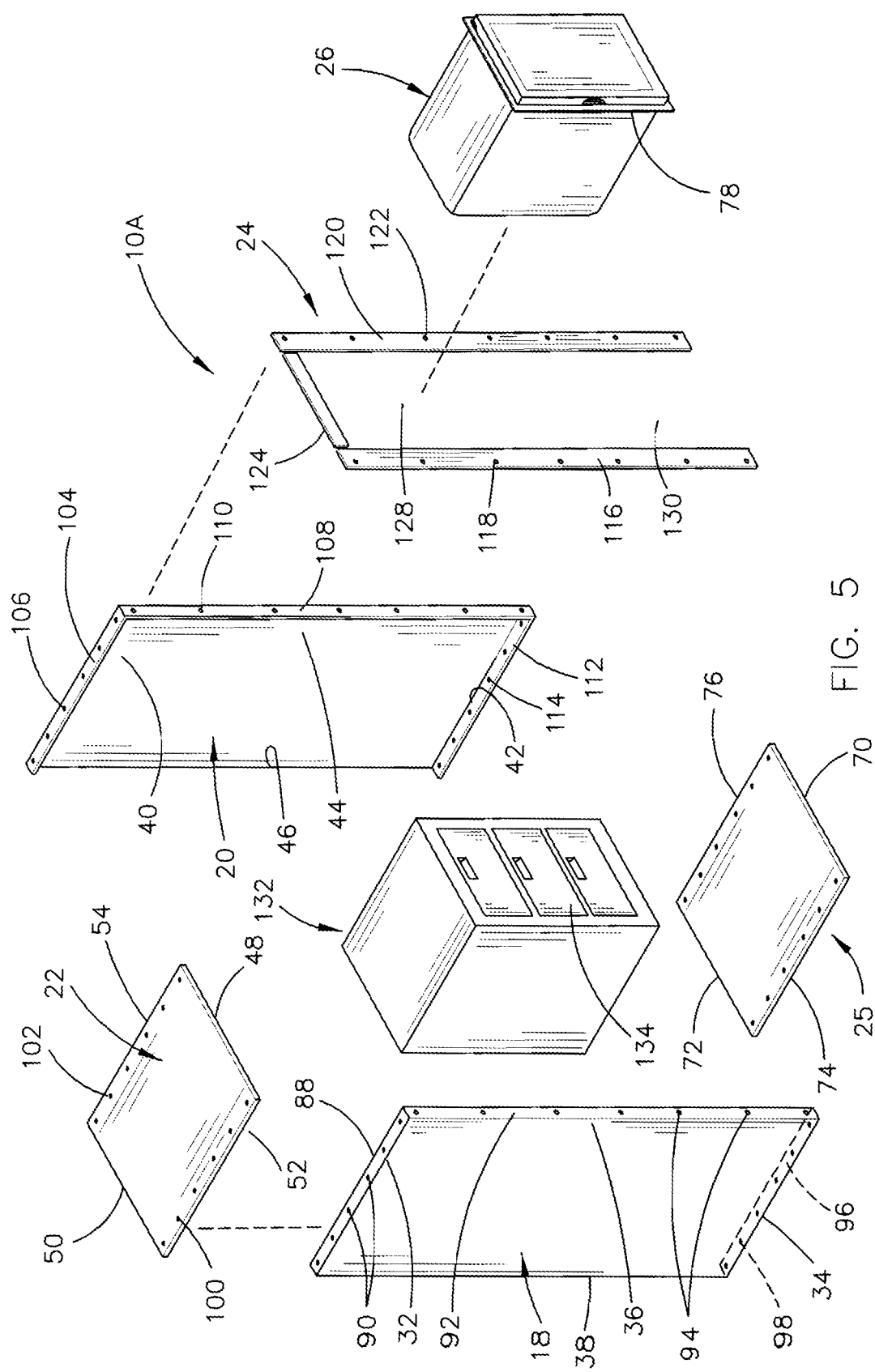
FIG. 5 is an exploded perspective view of another embodiment of the invention.
Figure 6:
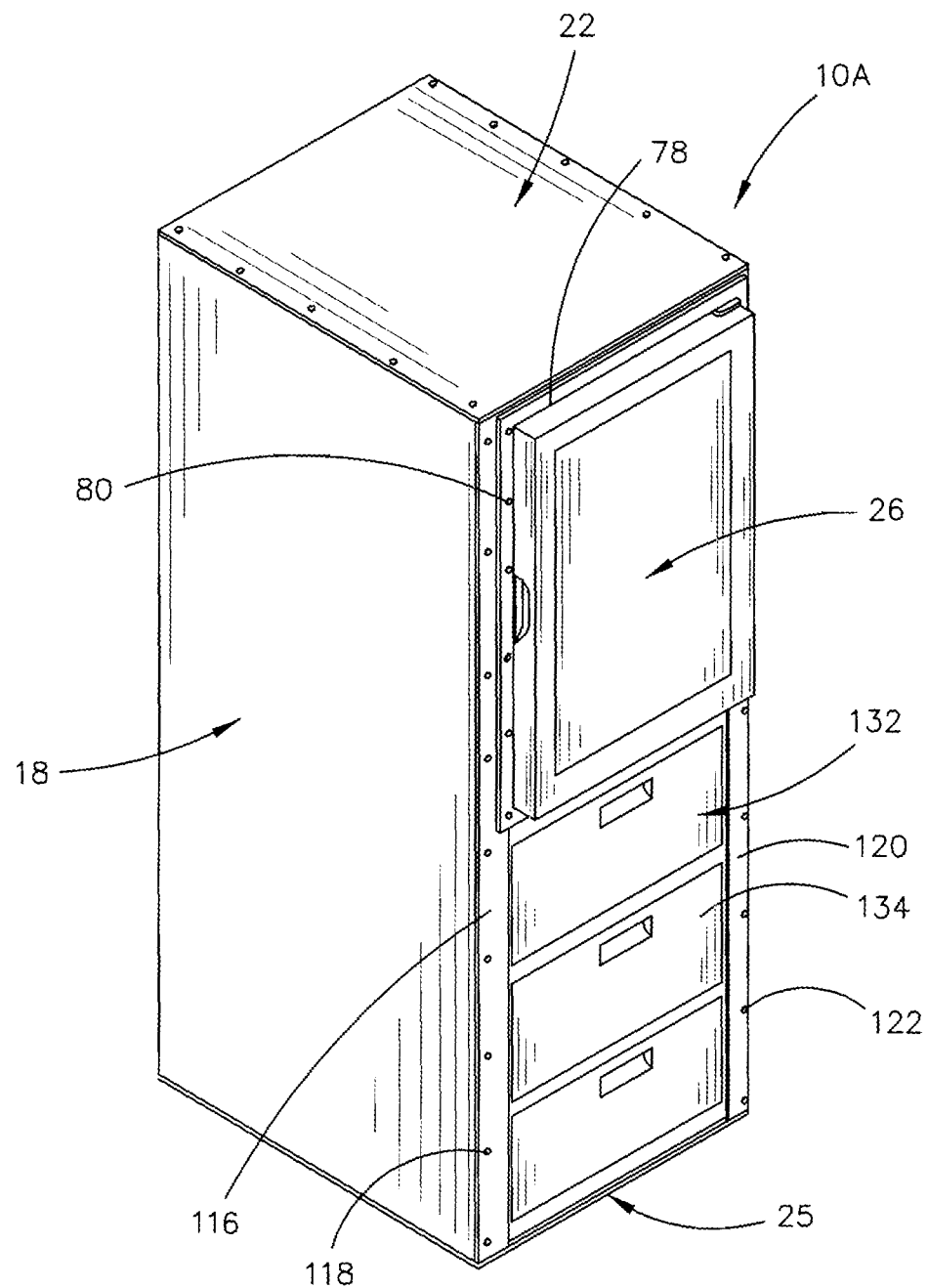
FIG. 6 is a front perspective view of the assembled embodiment of FIG. 5.

FIGS. 5 and 6 illustrate another embodiment of the kit 10 with a few changes. Kit 10A of FIG. 5 includes a first side panel 18, a second side panel 20, a top panel 22, a front panel or trim 24, a bottom panel 25 and a refrigerator 26. A mounting flange 88 extends inwardly from the upper end of side panel 18 and has a plurality of screw openings 90 formed therein. A mounting flange 92 extends inwardly from the front end of side panel 18 and has a plurality of screw openings 94 formed therein. A mounting flange 96 extends inwardly from the lower end of side panel 18 and has a plurality of screw openings 98 (not shown) formed therein.

Top panel 22 of kit 10A has a plurality of spaced-apart screw openings 100 formed therein at one side thereof and has a plurality of spaced-apart screw openings 102 formed therein and its other side. A mounting flange 104 extends inwardly from the upper end of side panel 20 and which has a plurality of spaced-apart screw openings 106 formed therein. A mounting flange 108 extends inwardly from the front end of side panel 20 and has a plurality of spaced-apart screw openings 110 formed therein. A mounting flange 112 extends inwardly from the lower end of side panel 20 and has a plurality of screw openings 114 formed therein.

The front panel 24 includes a vertically disposed side member 116 having a plurality of spaced-apart screw openings 118 formed therein. Front panel 24 also includes a vertically disposed side member 120 having a plurality of screw openings 122 formed therein. Front panel 24 also includes an upper member 124 which extends between the upper ends of side members 116 and 120. For purposes of description, the front panel defines an upper opening portion 128 and a lower opening portion 130. Front panel 24 may be of one-piece construction. However, front panel 24 could be of multiple members secured together as shown in FIG. 5.

The kit 10A is assembled as will now be described. Top panel 22 is positioned on the mounting flanges 88 and 104 of side panels 18 and 20 respectively so that screw openings 100 register with screw openings 90 and so that screw openings 102 register with screw openings 106. Screws are then inserted into the registering screw openings to secure top panel 22 to panels 18 and 20. The bottom panel 25 will normally be secured to the floor of the sleeper cab by screws or the like. The front panel 24 is then secured to the mounting flanges 92 and 108 by screws extending through screw openings 118 and 94 and by screws extending through screw openings 122 and 110. The refrigerator 26 is then positioned in upper opening portion 128. The flanges 78 of refrigerator 26 are then secured to the front panel 24 by screws.

The numeral 132 refers to a storage chest having drawers 134 slidably mounted therein. Chest 132 is then positioned in lower opening portion 130. The bottom of the storage chest 132 may be secured to the bottom panel 25 or the floor of the sleeper cab. The upper end of the chest 132 may support the weight of the refrigerator thereon. The kit 10A may be assembled within the sleeper cab 12 of the truck 14.

Figure 7:
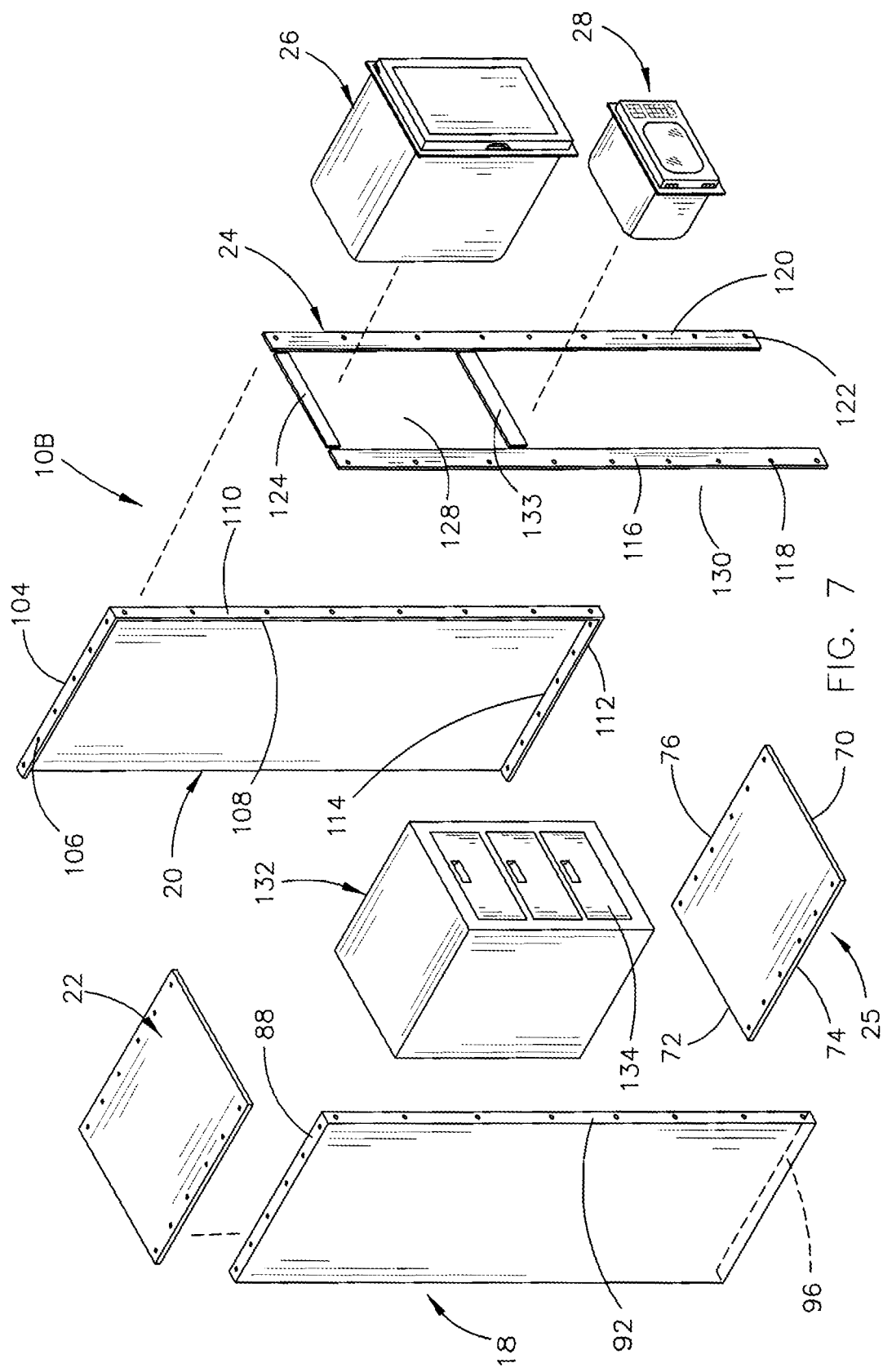
FIG. 7 is a exploded perspective view of another embodiment of the invention.
Figure 8:
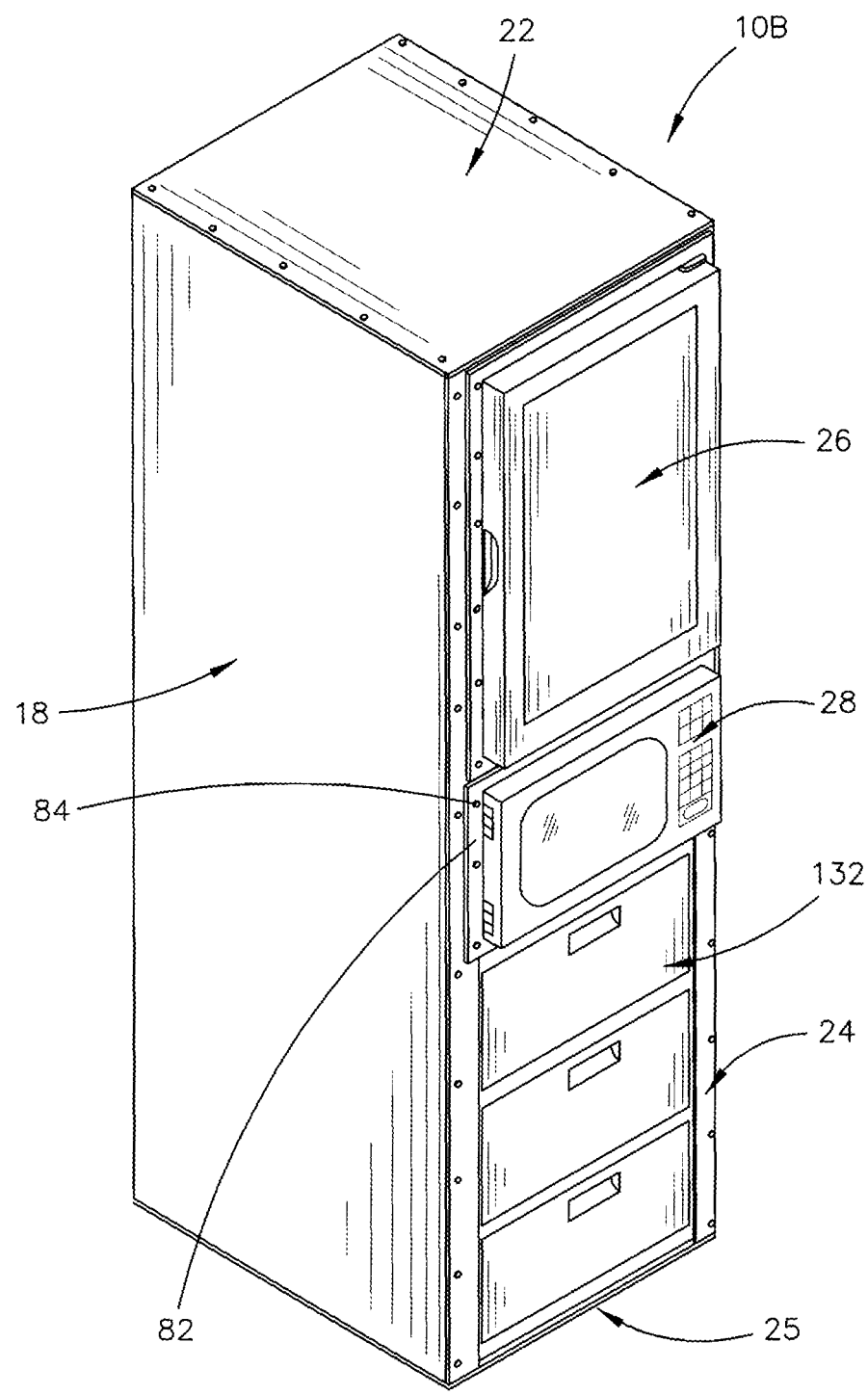
FIG. 8 is a front perspective view of the assembled embodiment of FIG. 7.

FIGS. 7 and 8 illustrate a kit 10B which is substantially similar to kit 10A except that the front panel 24 of FIG. 10B has a trim portion 133 extending between members 116 and 120. Microwave oven 28 is positioned in the opening portion 130 with the flanges 82 thereof being secured to the side members 116 and 120 of the front panel 24. The chest 132 is positioned below the microwave oven 28 in the lower opening portion 130.

Figure 9:
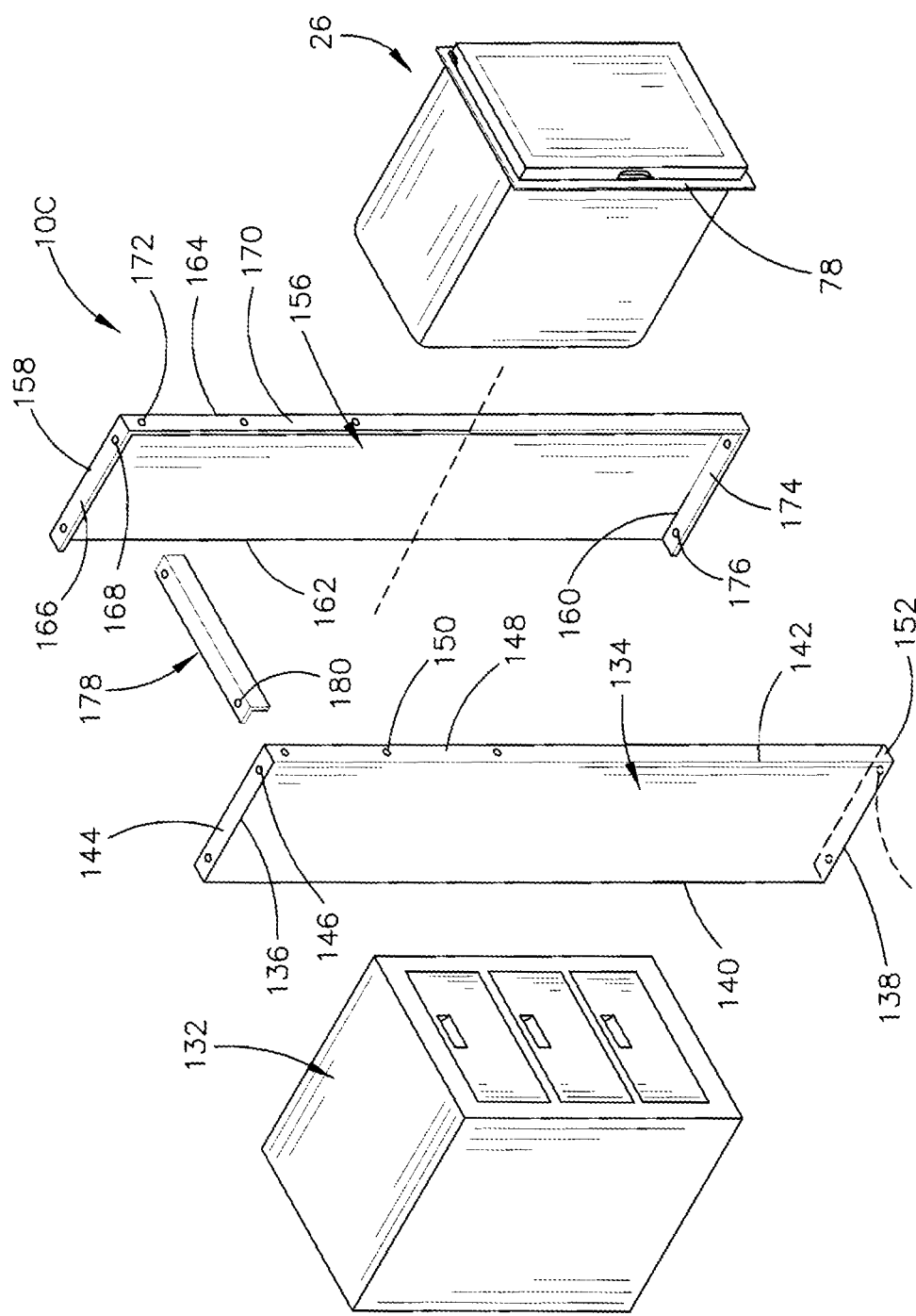
FIG. 9 is an exploded perspective view of another embodiment of the invention.

FIG. 9 is an exploded perspective view of another embodiment of the kit of this invention and is designated by the reference numeral 10C. As seen in FIG. 9, the kit 10C differs from the other embodiments described hereinabove in that kit 10C does not utilize an upper panel, a first side panel, a second side panel or a bottom panel. The embodiment of the kit shown in FIG. 9 is designed to be used in sleeper cabs which include a closet. Kit 10C includes a first side trim and support structure 134 having an upper end 136, a lower end 138, an inner end 140 and an outer end 142. A mounting flange 144 extends from the upper end 136 of the first side trim and support structure 134 and has screw openings 146 formed therein. A mounting flange 148 extends from the outer end 142 of the first side trim and support structure 134 and has screw openings formed therein. A mounting flange 152 extends from the lower end 138 of the first side trim and support structure 134 and has screw openings 154 formed therein.

The lower end 138 of the first side trim and mounting structure 134 and is secured to the floor of the sleeper cab 12 by screws extending downwardly through the screw openings 154 in mounting flange 152. The mounting flange 144 may be secured to existing structure in the sleeper cab 12.

Kit 10C also includes a second side trim and support structure 156 which is horizontally spaced from the first side trim and support structure 134. The second side trim and support structure 156 includes an upper end 158, a lower end 160, an inner end 162 and an outer end 164. A mounting flange 166 extends from the upper end 158 of the second side trim and support structure 156 and has screw openings 168 formed therein. A mounting flange 170 extends from the outer end 164 of the second side trim and support structure 156 and has screw openings 172 formed therein. A mounting flange 174 extends from the lower end 160 of the second side trim and support structure 156 and has screw openings 176 formed therein.

The lower end 160 of the second side trim and support structure 156 is secured to the floor of the sleeper cab 12 by screws extending downwardly through the screw openings 176 in mounting flange 174. The mounting flange 166 may be secured to existing structure in the sleeper cab 12.

An elongated support member 178 extends between the upper ends of the side trim and support structures 134 and 156 and has screw openings 180 formed therein. The support member 178 may be secured to existing structure in the sleeper cab 12 by screws extending upwardly through the screw openings 180 in support member 178.

The refrigerator 26 is positioned between the structures 134 and 156 at the upper ends thereof with flanges 78 of the refrigerator 26 being secured to the mounting flanges 148 and 170 by bolts or screws extending through the openings in the flanges 78 at the openings 150 and 172 in the mounting flanges 148 and 170 respectively. The chest 132 is positioned between the structures 134 and 156 and may be secured to the floor of the sleeper cab if so desired.

Figure 10:
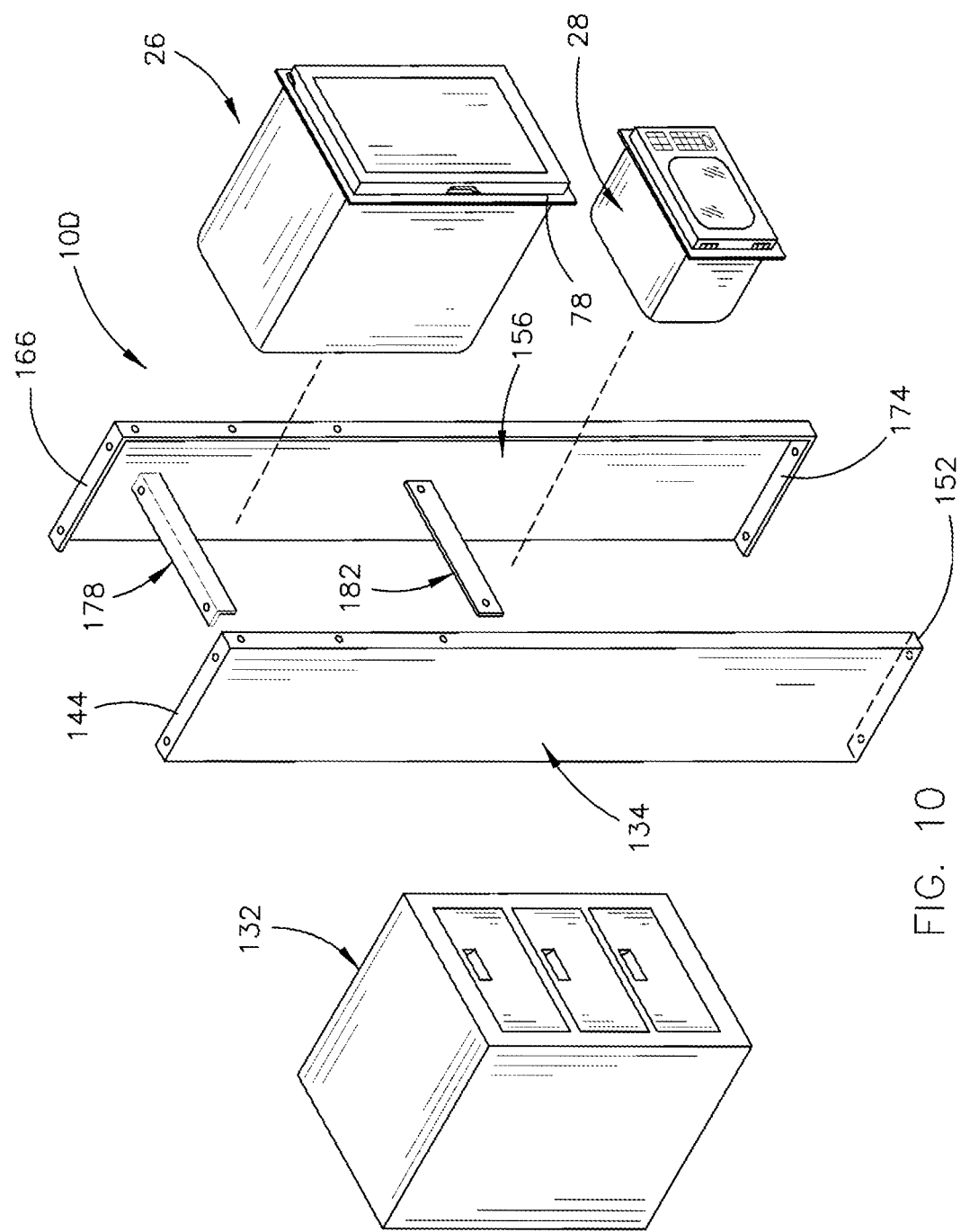
FIG. 10 is an exploded perspective view of another embodiment of the invention.

The kit 10D of FIG. 10 is substantially identical to kit 10C except for a support member 182 which extends between the structures 134 and 156 and for the fact that the kit 10D includes a microwave oven 28 which is positioned above the chest 132.

Both of the kits 10C and 10D may be assembled within the sleeper cab.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. In combination:
    a truck having a sleeper cab;
    a kit including the components of an upstanding cabinet;
    said components of said kit being configured to enable said upstanding cabinet to be completely assembled within said sleeper cab of said truck;
    said kit comprising:
        (a) a first side panel having an upper end, a lower end, a front end, a rear end, an inner side and an outer side;
        (b) a second side panel having an upper end, a lower end, a front end, a rear end, an inner side and an outer side;
        (c) a top panel having a front end, a back end, a first side and a second side;
        (d) a bottom panel having a front end, a rear end, a first side and a second side;
        (e) a front panel having an upper end, a lower end, a first side and a second side;
        (f) said front panel having an upper opening formed therein;
        (g) said front panel having one or more drawer openings formed therein below said upper opening;
        (h) said first side panel, said second side panel, said top panel, said front panel and said bottom panel being configured to be connected together in the sleeper cab to form the upstanding cabinet;
        (i) a refrigerator which is configured to be inserted into said upper opening of said front panel; and
        (j) a plurality of drawers configured to be positioned in said drawer openings in said front panel.

2. The combination of claim 1 wherein said refrigerator includes a mounting flange extending outwardly therefrom for attachment to said front panel.

3. In combination:
    a truck having a sleeper cab;
    a kit including the components of an upstanding cabinet;
    said components of said kit being configured to enable said upstanding cabinet to be completely assembled within said sleeper cab of said truck;
    said kit comprising:
        (a) first side panel having an upper end, a lower end, a front end, a rear end, an inner side and an outer side;
        (b) a second side panel having an upper end, a lower end, a front end, a rear end, an inner side and an outer side;
        (c) a top panel having a front end, a rear end, a first end and a second end;
        (d) a bottom panel having a front end, a rear end, a first side and a second side;
        (e) a front panel having an upper end, a lower end, a first side and a second side;
        (f) said front panel having an upper opening portion formed therein below said upper end thereof;
        (g) said front panel having an intermediate opening portion formed therein below said upper opening thereof;
        (h) said front panel having at least one drawer opening portion formed therein below said intermediate opening portion of said front panel;
        (i) said first side panel, said second side panel, said top panel, said bottom panel and said front panel being configured to be connected together in the sleeper cab to form an upstanding cabinet;
        (j) a refrigerator which is configured to be inserted into said upper opening portion in said front panel;
        (k) a microwave oven which is configured to be inserted into said intermediate opening portion in said front panel; and (l) at least one drawer configured to be positioned in said drawer opening portion.

4. The combination of claim 3 wherein said refrigerator includes a mounting flange extending outwardly therefrom for attachment to said front panel and wherein said microwave oven includes a mounting flange extending outwardly therefrom for attachment to said front panel.

5. In combination:
a truck having a sleeper cab;
a kit including the components of an upstanding cabinet;
said components of said kit being configured to enable said upstanding cabinet to be completely assembled within said sleeper cab of said truck;
said kit comprising:
 (a) a first side panel having an upper end, a lower end, a front end, a rear end, an inner side and an outer side;
 (b) a second side panel having an upper end, a lower end, a front end, a rear end, an inner side and an outer side;
 (c) a top panel having a front end, a back end, a first side and a second side;
 (d) a bottom panel having a front end, a rear end, a first side and a second side;
 (e) a front panel having an upper end, a lower end, a first side and a second side;
 (f) said front panel having an upper opening formed therein;
 (g) said front panel having a storage chest opening formed below said upper opening;
 (h) said first side panel, said second side panel, said top panel, said front panel and said bottom panel being configured to be connected together in the sleeper cab to form the upstanding cabinet;
 (i) a refrigerator which is configured to be inserted into said upper opening of said front panel;
 (j) a storage chest configured to be inserted into said storage chest opening in said front panel; and
 (k) said storage chest having at least one drawer slidably mounted therein.

6. In combination:
a truck having a sleeper cab;
a kit including the components of an upstanding cabinet;
said components of said kit being configured to enable said upstanding cabinet to be completely assembled within said sleeper cab of said truck;
said kit comprising:
 (a) a first side panel having an upper end, a lower end, a front end, a rear end, an inner side and an outer side;
 (b) a second side panel having an upper end, a lower end, a front end, a rear end, an inner side and an outer side;
 (c) a top panel having a front end, a rear end, a first end and a second end;
 (d) a bottom panel having a front end, a rear end, a first side and a second side;
 (e) a front panel having an upper end, a lower end, a first side and a second side;
 (f) said front panel having an upper opening portion formed therein below said upper end thereof;
 (g) said front panel having an intermediate opening formed therein below said upper opening thereof;
 (h) said front panel having a storage chest opening formed therein below said intermediate opening in said front panel;
 (i) said first side panel, said second side panel, said top panel, said bottom panel and said front panel being configured to be connected together in the sleeper cab to form the upstanding cabinet;
 (j) a refrigerator which is configured to be inserted into said upper opening portion in said front panel;
 (k) a microwave oven which is configured to be inserted into said intermediate opening portion in said front panel;
 (l) a storage chest configured to be inserted into said storage chest opening portion in said front panel; and
 (m) said storage chest having at least one drawer slidably mounted therein.

7. In combination:
a truck having a sleeper cab;
said sleeper cab having a floor;
a kit including the components of an upstanding support;
said components of said kit being configured to enable said upstanding support to be completely assembled within said sleeper cab of said truck;
said kit comprising:
 (a) a first side trim and support structure having an upper end, a lower end, an inner end and an outer end;
 (b) said lower end of said first side trim and support structure being configured to be secured to the floor of the sleeper cab;
 (c) said upper end of said first side trim and support structure being configured to be secured to the sleeper cab;
 (d) a second side trim and support structure having an upper end, a lower end, an inner end and an outer end;
 (e) said second side trim and support structure being horizontally spaced from said first side trim and support structure;
 (f) said lower end of said second side trim and support structure being configured to be secured to the floor of the sleeper cab;
 (g) said upper end of said second side trim and support structure being configured to be secured to the sleeper cab;
 (h) a horizontally disposed support member adapted to be extended between said upper ends of said first and second side trim and support structures;
 (i) said support member being configured to be secured to the sleeper cab;
 (j) a storage chest configured to be positioned between said first and second side trim and support structures at said lower ends thereof; and
 (k) a refrigerator configured to be positioned between and secured to said first and second side trim and support structures at said upper ends thereof.

8. In combination:
a truck having a sleeper cab;
said sleeper cab having a floor;
a kit including the components of an upstanding support;
said components of said kit being configured to enable said upstanding support to be completely assembled within said sleeper cab of said truck;
said kit comprising:
 (a) a first side trim and support structure having an upper end, a lower end, an inner end and an outer end;
 (b) said lower end of said first side trim and support structure being configured to be secured to the floor of the sleeper cab;

(c) said upper end of said first side trim and support structure being configured to be secured to the sleeper cab;
(d) a second side trim and support structure having an upper end, a lower end, an inner end and an outer end;
(e) said second side trim and support structure being horizontally spaced from said first side trim and support structure;
(f) said lower end of said second side trim and support structure being configured to be secured to the floor of the sleeper cab;
(g) said upper end of said second side trim and support structure being configured to be secured to the sleeper cab;
(h) a first support member adapted to be extended between said upper ends of said first and second side trim and support structures;
(i) said first support member being configured to be secured to the sleeper cab;
(j) a second support member adapted to be extended between said first and second side trim and support structures below said first support member;
(k) a storage chest configured to be positioned between said first and second side trim and support structures at said lower ends thereof;
(l) a refrigerator configured to be positioned between and secured to said first and second side trim and support structures at said upper ends thereof; and
(m) a microwave oven configured to be positioned between said first and second side trim and support structures above said storage chest.

* * * * *